July 28, 1959
R. D. MARCUS ET AL
2,896,555
PIE CRUST FORMER
Filed July 22, 1957
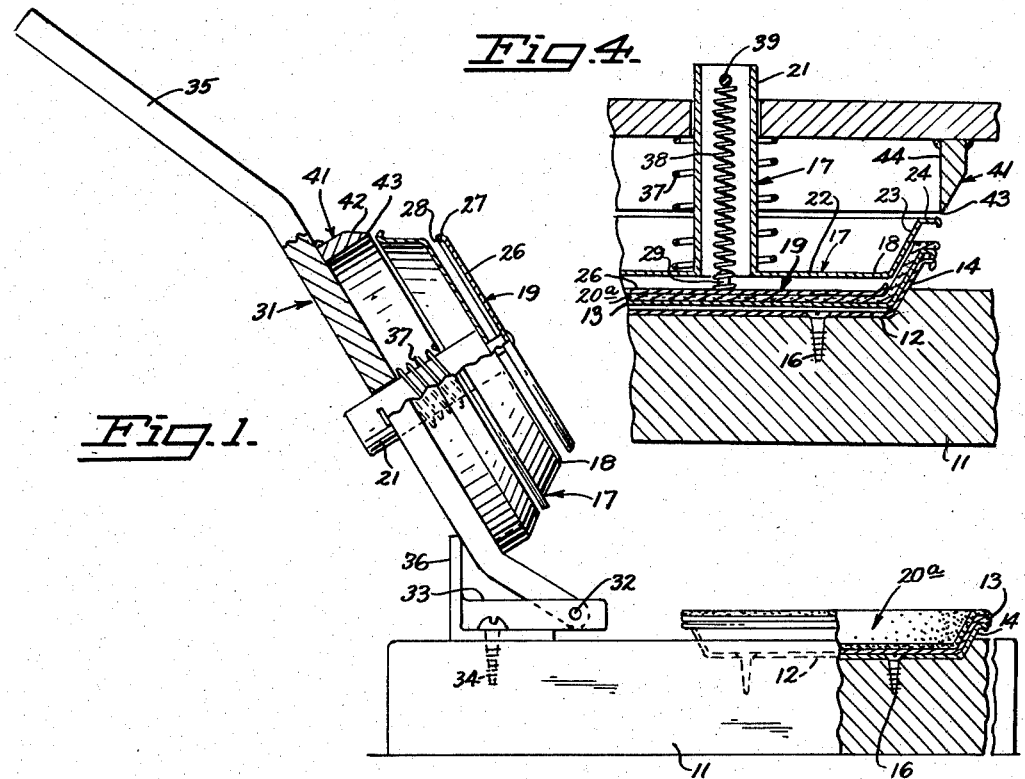
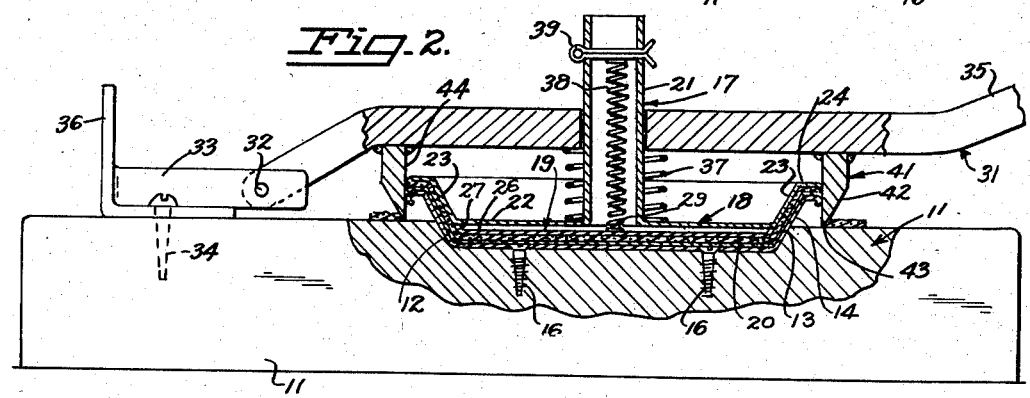
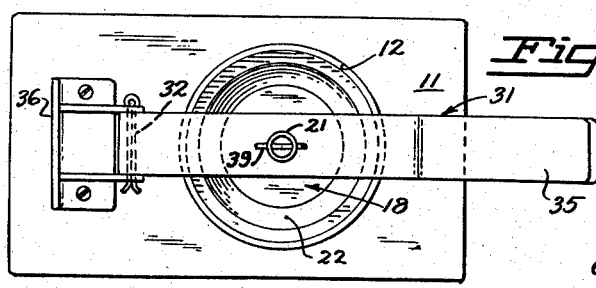
INVENTORS
RICHARD MARCUS
JERRY ZONES
BY ALFRED PRECIADO
ATTORNEY.

United States Patent Office 2,896,555
Patented July 28, 1959

2,896,555

PIE CRUST FORMER

Richard D. Marcus, Jerry J. Zones, and Alfred Preciado, San Francisco, Calif.

Application July 22, 1957, Serial No. 673,351

7 Claims. (Cl. 107—15)

The invention, in general, relates to dough handling equipment and more particularly relates to an improved quick-acting device affording thin, flaky pie crust in pie plates in a minimum of time.

While there have heretofore been devised a number and variety of types of pie crust forming machines, the majority of these prior devices have been unsatisfactory due to the inherent disadvantage of the rapid development of dough on the parts of the former element which not only results in pie crust of uneven thicknesses or lumpy portions therein but also causes delays in operations because of the requirement of having to remove accumulated dough on the functional elements of these prior devices. Moreover, such prior equipment not only does not afford pie crust with trimmed peripheries but, because of such deficiencies, the prepared pie crust from these former devices is unsightly and presents difficulties in the proper baking of the pie due to the excessive amounts of burned up portions dropped from untrimmed crust edges. The present invention is directed to the provision of an improved device for forming pie crust which obviates the disadvantages of prior art crust formers and which affords rapid and facile production of uniformly thin pie crust.

A primary object of the invention is to provide a pie crust former which effectively reduces to a minimum dough accumulation on the forming elements thereof and thereby maintains operable functional elements for appreciably longer periods of time.

Another important object of our invention is to provide an improved pie crust former of the indicated nature which is additionally characterized by the incorporation therein of a self-acting trimmer so as to afford neat peripheral edges on all crust produced.

A still further object of our present invention is to provide an improved pie crust former of the aforementioned character which includes positive acting means for shaking excess dough from former elements to prevent the formation of lumpy pie crust or crust of uneven thicknesses.

A still further object of our invention is to provide a pie crust former of the indicated nature which is relatively inexpensive to manufacture, to operate and to maintain.

Other objects of our invention, together with some of the advantageous features thereof, will appear from the following description of a preferred embodiment of our invention which is illustrated in the accompanying drawings. It is to be understood, however, that we are not to be limited to the precise embodiment illustrated, nor to the precise arrangement of the several parts thereof, as our invention, as defined in the appended claims, can be embodied in a plurality and variety of forms.

Referring to the drawings:

Fig. 1 is a fragmentary, front elevational view, partly in section, of a preferred embodiment of the invention, this view showing the former element in raised position and at rest.

Fig. 2 is an enlarged front elevational view, partly in section and with parts broken away to illustrate the construction, of a preferred embodiment of our present invention.

Fig. 3 is a top elevational view of a preferred embodiment of our invention with the former element in operative position for the production of a pie crust.

Fig. 4 is an enlarged cross-sectional detail of the preferred embodiment of our invention with the former element in operative position.

In its preferred form, the improved pie crust former of our present invention preferably comprises a base having a recess therein for the removable reception of a pie plate on which a predetermined quantity of dough may be deposited, a two-section forming element, means for yieldably mounting each section of said forming element separately, together with means for pressing said forming element into engagement with dough on a pie plate seated in said recess, and an annular cutter fixedly mounted adjacent to said forming element for trimming the peripheral edges of a pie crust formed from dough deposited on a pie plate in said recess.

As particularly illustrated in Figs. 1, 2 and 4 of the annexed drawings, it will be observed that our improved pie crust former includes a base 11 in which is fashioned a dish-like recess 12 for the removable reception of a succession of pie plates 13. It is to be understood, of course, that for pie plates of different diameters different pie crust formers of our invention are utilized for accommodating the different sizes of pie plates. As shown, a fixed die element 14 is secured in the bottom of recess 12, by any suitable means such as by means of counter-sunk screws 16 and this fixed die 14 preferably is in the form of a standard pie plate; such fixed die serving as a seat for the succession of pie plates 13 which are to be filled with dough for the formation of the pie crust therein.

In accordance with our invention, a two-section die or forming element, generally designated by the reference numeral 17, is mounted for cooperation with the fixed die 14 in the bottom of recess 12; such die 17 including an inner movable member 18 and an outer yieldably mounted element 19 which together function in pressing down upon dough 20 deposited on plate 13 against the rigid fixed die 14 to form relatively thin and flaky pie crust 20a, see Fig. 1. The inner yieldably mounted element 18 of die 17 preferably is constructed of a hollow central post 21 which merges with a bottom shaped to the form of a pie plate including a circular flat annulus 22 merging at its perimeter with a slanting annulus 23 which, in turn, merges with a flat annular rim 24. The yieldably mounted outer forming element 19 of die 17 preferably is formed to a generally pie shaped construction with a flat central disc 26 merging into a slanting annulus 27 which, in turn, merges with a flat annular rim 28; such outer former element 19 including a central stem 29 which serves as a mounting member for this outer forming element. While any suitable means may be employed for mounting and carrying the movable die 17, I preferably employ a movable arm 31 which conveniently is pivotally connected by means of a pivot pin 32 to a bracket 33 secured by means of a screw 34 to the base 11 adjacent to the recess 12; such arm 31 having a centrally located aperture therein for passing the central post 21 of the inner yieldably mounted element 18 of the movable die 17 and the arm 31 conveniently having an extension thereon serving as a handle 35 for conveniently manipulating the arm from one position to another. When not in use, the movable die 17 can be placed in an at rest position by moving the arm 31 towards and against an abutment 36 which is a part of the bracket 33 and extends normal thereto, the arm resting against the abutment 36 as shown in Fig. 1.

The inner forming element 18 of the movable die 17 conveniently is yieldably mounted by means of a compression spring 37 which is confined between the inner side of the arm 31 and the upper surface of the flat annulus 22 of the inner forming element 18, such spring 37 encircling the central post as shown particularly in Figs. 2 and 4. When the arm 31 has been moved to a pie crust forming position, as shown in Fig. 2, the spring 37 is under compression and immediately after the pie crust has been formed and the arm 31 raised by lifting the same by the handle 35, the spring 37 resumes its normal position as shown in Fig. 4 of the drawings. The outer yieldably mounted element 19 of the movable die 17 conveniently is held upon a spring 38 which is anchored at its one end to the central post 21 of the inner forming element 18 and is anchored at its other end to the central stem 29 of the outer forming element 19. Spring 38 is under compression when the movable die has been brought to the position shown in Fig. 2 in the forming of a pie crust and it resumes its normal position when the arm 31 is moved away from the base 11 thus maintaining the outer die 19 in spaced relationship to the inner forming element 18. When released from a pressing relation with the fixed die 14, the outer forming element 19 quickly springs back to its normal position, as shown in Fig. 4, and in such snap action return any dough tending to adhere to the exterior surface of such forming element 19 is shaken therefrom and the forming element or movable die 17 is thus kept relatively clean of dough for appreciable periods of time. It may be observed here that the central post 21 of the inner yieldably mounted element 18 of the movable die 17 is formed with a hole therethrough adjacent its outer end for the reception of a cotter pin 39 serving as a mounting means for this inner yieldable element 18 and preventing the dislodgment of such yieldable element from the arm 31.

To the end that excess dough be eliminated from the rim of the formed pie crust 20a, we provide a dough trimmer as an integral component of the former, such trimmer being designated generally by the reference numeral 41 in the annexed drawings. As shown, the trimmer 41 is in the form of a metal annulus and is preferably welded or otherwise firmly secured to the underside of the arm 31. The outer periphery of trimmer 41 is bevelled throughout its circumference, as indicated by the reference numeral 42, to afford a pointed, knife-like edge 43 with a straight inner wall 44 on the trimmer. The trimmer 41 is so disposed and affixed to the arm 31 that the inner wall 44 of the trimmer is closely adjacent to the outer edges of the rims of the movable die elements 18 and 19 as well as of the rims of the pie plate 13 and the fixed or stationary die 14 when the arm 31 is moved downwardly to bring the movable die 17 into engagement into the dough disposed on the pie plate 13. In this downward movement of the arm 31 to form a pie crust, the pointed outer edge 43 of the trimmer 41 as well as the inner wall 44 thereof scrapes off whatever portions of dough that might otherwise cling to the outer edges of the rim of the pie plate 13 and thus affords a neat appearing pie crust around its outer rim.

In the operation of our improved pie crust former, a succession of pie plates 13 are removably disposed on top of the fixed die 14 in the recess 12 of the base of the former, and successive batches of dough 20 are disposed on each pie plate 13 in succession. After the deposit of dough on each pie plate 13, the arm 31 is brought downwardly to cause the movable die 17 to bear down upon the dough 20 in the plate 13 thus spreading the dough and forming a thin flaky pie crust on each plate 13. In this action, the springs 37 and 38, on which the inner and outer forming elements 18 and 19 of the movable die 17 are mounted, become compressed and on the immediately following action of lifting the arm 31, the former elements 18 and 19 quickly snap back to their initial positions upon the expansion of the springs 37 and 38; the snap-return action of the outer former element 19 preventing the accumulation of dough thereon which, if not removed, would result in the forming of lumpy pie crusts on the succeeding pie plates. After each pie crust is so formed and its outer peripheral edge trimmed by the action of the trimmer 41, a second as well as successive pie plates which may carry pie crust dough or have the dough deposited thereon, are set upon the fixed or stationary die 14 for the making of additional pie crusts on the successive pie plates. As illustrated, the improved pie crust former of our invention is of relatively simple construction and is inexpensive to manufacture and maintain. We have successfully employed the illustrated and described embodiment of our invention in the forming of innumerable pie crusts, free of lumps and of relatively thin section, with the result that thin, flaky pie crusts have been produced therefrom upon the baking of pies.

It is to be understood that the appended claims are to be accorded a range of equivalents commensurate in scope with the advance made over the prior art.

We claim:

1. A pie crust former comprising a base having a recess therein, a pie plate die fixedly secured in the bottom of said recess; said pie plate die serving to receive a succession of pie plates on which pie crust dough may be deposited, a two-section movable die; one of said sections of said two-section die being arranged in superposed relationship to the other of the sections, an arm pivotally secured to said base adjacent to said recess, and means yieldably mounting each section of said movable die independently on said arm in opposed relationship to said pie plate die; said two-section die forming the pie crust dough into a pie crust upon movement of said arm to bring said two-section die into pressing engagement with dough on a pie plate seated on said fixed pie plate die.

2. A pie crust former comprising a base having a recess therein, a pie plate die fixedly secured in the bottom of said recess; said pie plate die serving to receive a succession of pie plates on each of which pie crust dough may be deposited, a two-section movable die; one of said sections of said two-section die being arranged in superposed relationship to the other of the sections, an arm pivotally secured to said base adjacent to said recess, means yieldably mounting each section of said movable die on said arm independently and in opposed relationship to said fixed pie plate die, and an annular trimmer mounted on said arm and surrounding said movable die; said two-section die forming the pie crust dough into a pie crust upon the movement of said arm to bring said two-section die into pressing engagement with dough on a pie plate seated on said fixed pie plate die, and said trimmer simultaneously scraping excess dough from the peripheral edge of the formed pie crust.

3. A pie crust former comprising a base having a recess therein, a fixed die of pie plate construction secured to the bottom of said recess; said fixed die serving to receive a succession of pie plates on which pie crust dough may be carried, a movable die consisting of an inner section and an outer section with relation to said fixed die, an arm pivotally mounted on said base adjacent to said recess, a first means yieldably mounting said inner section of said movable die on said arm, and a second means yieldably mounting said outer section of said movable die on said arm; said first and said second means being concentric and so arranged as to dispose said movable die in opposed relationship to said fixed die, pivotal movement of said arm to bring said movable die into pressing engagement with pie crust dough deposited on a pie plate seated on said fixed die effecting the formation of a pie crust.

4. A pie crust former comprising a base having a recess therein, a fixed die of pie plate construction secured to the bottom of said recess; said fixed die serving to receive a succession of pie plates on which pie crust dough may be carried, a movable die consisting of an inner section and an outer section with relation to said fixed die, an arm pivotally mounted on said base adjacent to said recess, a first means yieldably mounting said inner section of said movable die on said arm, a second means yieldably mounting said outer section of said movable die on said arm; said first and second means being concentric and so arranged as to dispose said movable die in opposed relationship to said fixed die, and an annular trimmer mounted on said arm and surrounding said movable die; said two-section die forming pie crust dough into a pie crust upon movement of said arm in order to bring said movable die into pressing engagement with dough on a pie plate seated on said fixed die, and said trimmer simultaneously scraping excess dough from the peripheral edge of the formed pie crust.

5. In a pie crust former including a fixed die for receiving a succession of pie plates on which pie crust dough is carried, a movable die consisting of an inner section and an outer section; one of said sections of said movable die being arranged in superposed relationship to the other of the sections, a pivotally mounted arm on which said movable die is mounted for swinging said movable die into pressing engagement with dough carried on a pie plate seated on said fixed die, and means yieldably connecting said outer section of said movable die to said arm for effecting the snap return of said outer section to an initial position upon swinging said arm away from pressing engagement with dough carried on said pie plate after each pie crust forming action to prevent accumulation of dough on said movable die.

6. A pie crust former comprising a base having a recess therein, an arm pivotally mounted on said base adjacent said recess, a fixed die of pie plate construction secured to the bottom of said recess, an outwardly extending flange defining a flat rim on said fixed die; said fixed die serving to receive a succession of pie plates on which pie crust dough may be carried, a movable die consisting of an inner section and an outer section with relation to said fixed die, an outwardly extending flange defining a rim on each of said sections of said movable die, a first means yieldably mounting said inner section of said movable die on said arm, and a second means yieldably mounting said outer section of said movable die on said arm; said first and second means being concentric and so arranged as to dispose said movable die in opposed relationship to said fixed die, swinging of said arm to adjacent said base effecting the pressing engagement of said movable die with dough carried on said pie plate and bringing the rims of said sections of said movable die into pressing engagement with dough extending over the rim of said fixed die thereby forming the dough into a pie crust, and swinging of said arm away from said fixed die effecting the snap-return of said outer section of said movable die to its initial position whereby any dough accumulated thereon in the forming action is shaken off.

7. A pie crust former comprising a base having a recess therein, a fixed die of pie plate construction secured to the bottom of said recess; said fixed die serving to receive a succession of pie plates on which pie crust dough may be carried, a movable die consisting of an inner section and an outer section with relation to said fixed die, an arm pivotally mounted on said base adjacent to said recess, a first compression spring confined between the underside of said arm and the upper side of said inner section, a second spring anchored to said inner section at its one end and anchored to said outer section at its outer end for yieldably mounting said outer section of said movable die, and an annular trimmer mounted on said arm and surrounding said movable die; said movable die effecting the formation of a pie crust when brought into pressing engagement with dough on a pie plate seated on said fixed die by the swinging of said arm to adjacent said fixed die, and said trimmer simultaneously scraping excess dough from the peripheral edge of the formed pie crust.

References Cited in the file of this patent

UNITED STATES PATENTS

| | | |
|---|---|---|
| 808,015 | Coppins | Dec. 19, 1905 |
| 903,584 | Kohler | Nov. 10, 1908 |
| 2,232,633 | Richardson | Feb. 18, 1941 |
| 2,409,021 | Dale | Oct. 8, 1946 |
| 2,596,388 | Elvis | May 13, 1952 |